US009150985B2

United States Patent
Juillard et al.

(10) Patent No.: US 9,150,985 B2
(45) Date of Patent: Oct. 6, 2015

(54) METHOD OF MANUFACTURING WEAVED PREFORM WITH ORIENTED WEFT YARNS

(71) Applicant: Groupe CTT Inc., St-Hyacinthe (CA)

(72) Inventors: Nicolas Juillard, Montreal (CA); Olivier Guy Robert Vermeersch, St-Hyacinthe (CA); Jonathan Levesque, Mont Saint-Hilaire (CA)

(73) Assignee: GROUPE CTT INC., St-Hyacinthe, Quebec ( * ) Notice: Subject to any disclaimer, the term of this patent is extended or adjusted under 35 U.S.C. 154(b) by 0 days.

(21) Appl. No.: 14/355,997

(22) PCT Filed: Nov. 5, 2012

(86) PCT No.: PCT/CA2012/050782
§ 371 (c)(1),
(2) Date: May 2, 2014

(87) PCT Pub. No.: WO2013/063703
PCT Pub. Date: May 10, 2013

(65) Prior Publication Data
US 2014/0283944 A1    Sep. 25, 2014

Related U.S. Application Data

(60) Provisional application No. 61/555,163, filed on Nov. 3, 2011.

(51) Int. Cl.
*D03D 13/00*     (2006.01)
*D03D 25/00*     (2006.01)
*D03D 1/00*      (2006.01)
(Continued)

(52) U.S. Cl.
CPC .. *D03D 1/00* (2013.01); *D01F 9/12* (2013.01); *D03D 3/00* (2013.01); *D03D 11/00* (2013.01); *D03D 13/00* (2013.01); *D03D 15/12* (2013.01); *D03D 25/005* (2013.01); *D10B 2505/02* (2013.01)

(58) Field of Classification Search
CPC ... D03D 25/005; D03D 11/02; D03D 41/004; D03D 11/00; D03D 13/002; D03D 13/00; D03D 1/00; D03D 3/00; D03D 3/08; B29B 11/04; D10B 2505/02; D10B 2101/12; B29D 1/005; B29D 24/004; B29K 2105/0845; B29K 2707/04; B29K 2105/0809
See application file for complete search history.

(56) References Cited

U.S. PATENT DOCUMENTS

| 4,379,798 | A | * | 4/1983 | Palmer et al. | 428/113 |
| 4,922,968 | A | * | 5/1990 | Bottger et al. | 139/384 R |

(Continued)

*Primary Examiner* — Bobby Muromoto, Jr.
(74) *Attorney, Agent, or Firm* — Norton Rose Fulbright Canada (57) ABSTRACT

A method of producing a fiber preform, including forming a weaved preform fabric with a connection zone and multiple layers extending therefrom, each layer having an edge attached to the connection zone with a remainder of the layers extending freely from each other and from the connection zone, the attached edges being parallel and adjacent one another, each of the layers having a weaved structure including warp yarns extending at least substantially parallel to the attached edges and weft yarns extending at least substantially perpendicularly to the warp yarns, deforming at least one of the layers along a direction at least substantially parallel to the warp yarns until the weft yarns thereof have a corresponding desired orientation with respect to the warp yarns, and attaching the layers together away from the attached edges. A method of forming a weaved preform fabric for a fiber preform is also discussed.

20 Claims, 8 Drawing Sheets

(51) Int. Cl.
*D01F 9/12* (2006.01)
*D03D 3/00* (2006.01)
*D03D 11/00* (2006.01)
*D03D 15/12* (2006.01)

(56) References Cited

U.S. PATENT DOCUMENTS

| | | | |
|---|---|---|---|
| 5,026,595 A * | 6/1991 | Crawford et al. | 428/193 |
| 5,085,252 A | 2/1992 | Mohamed et al. | |
| 5,100,713 A * | 3/1992 | Homma et al. | 428/102 |
| 5,160,471 A * | 11/1992 | Vives et al. | 264/136 |
| 5,418,035 A * | 5/1995 | Iguchi et al. | 428/119 |
| 5,451,448 A * | 9/1995 | Sawko et al. | 428/175 |
| 5,665,451 A | 9/1997 | Dorn et al. | |
| 5,783,279 A * | 7/1998 | Edgson et al. | 428/116 |
| 6,446,675 B1 * | 9/2002 | Goering | 139/11 |
| 6,712,099 B2 * | 3/2004 | Schmidt et al. | 139/383 R |
| 6,874,543 B2 * | 4/2005 | Schmidt et al. | 139/383 R |
| 7,247,212 B2 * | 7/2007 | Kostar et al. | 156/89.11 |
| 7,413,999 B2 * | 8/2008 | Goering | 442/181 |
| 7,655,581 B2 * | 2/2010 | Goering | 442/205 |
| 7,712,488 B2 * | 5/2010 | Goering et al. | 139/384 R |
| 7,713,893 B2 * | 5/2010 | Goering | 442/246 |
| 7,943,535 B2 * | 5/2011 | Goering et al. | 442/205 |
| 8,079,387 B2 * | 12/2011 | Goering et al. | 139/11 |
| 8,127,802 B2 * | 3/2012 | Ouellette et al. | 139/11 |
| 8,440,276 B2 * | 5/2013 | Rose et al. | 428/34.5 |
| 8,505,588 B2 * | 8/2013 | Coupe et al. | 139/11 |
| 2002/0023871 A1 * | 2/2002 | Talbot et al. | 210/266 |
| 2010/0105268 A1 * | 4/2010 | Ouellette et al. | 442/203 |
| 2010/0105269 A1 * | 4/2010 | Goering et al. | 442/205 |
| 2010/0167007 A1 * | 7/2010 | Goering | 428/124 |
| 2011/0111664 A1 * | 5/2011 | Goering et al. | 442/181 |
| 2012/0251793 A1 * | 10/2012 | Goering et al. | 428/192 |
| 2013/0108417 A1 * | 5/2013 | Renon | 415/173.1 |
| 2013/0216770 A1 * | 8/2013 | Gilbertson et al. | 428/121 |

* cited by examiner

METHOD OF MANUFACTURING WEAVED PREFORM WITH ORIENTED WEFT YARNS

CROSS-REFERENCE TO RELATED APPLICATIONS

This application is a national phase entry of PCT/CA2012/050782 filed Nov. 5, 2012, which claims priority from U.S. provisional application No. 61/555,163 filed Nov. 3, 2011, the entire contents of both of which are incorporated by reference herein.

FIELD OF THE INVENTION

The present invention relates to fabric preforms for composite materials, and more particularly to a method for manufacturing such preforms having non-perpendicular weft and warp yarns.

BACKGROUND ART

Tridimensional fiber preforms are used to produce composite structural elements, for use for example in aircraft, infrastructure, industrial components, etc. Such preforms are typically manufactured through weaving of orthogonal warp and weft yarns, with more complex shapes being sometimes obtained through folding of the fabric after weaving. However such preforms may have limited mechanical properties.

Other preforms are manufactured by weaving the weft yarns at different angles from the warp yarns, but the weaving machines required to obtain such weaving patterns are usually complex and/or have limitations as to the weft yarn orientations that can be achieved.

SUMMARY

In one aspect, there is provided a method of producing a fiber preform for a composite structural element, the method comprising: forming a weaved preform fabric including a connection zone and multiple layers extending from the connection zone, each layer having an edge attached to the connection zone with a remainder of each of the layers extending freely from each other and from the connection zone, the attached edges being parallel and adjacent one another, each of the layers having a weaved structure including warp yarns extending at least substantially parallel to the attached edges and weft yarns extending at least substantially perpendicularly to the warp yarns; deforming at least one of the layers along a direction at least substantially parallel to the warp yarns until the weft yarns thereof have a corresponding desired orientation with respect to the warp yarns, the desired orientation being between 0° and ±90°; and attaching the layers together away from the attached edges to retain the at least one deformed layer at the desired orientation.

In another aspect, there is provided a fiber preform produced by the above method.

In another aspect, there is provided a method of forming a weaved preform fabric for a fiber preform of a composite structural element, the method comprising weaving a plurality of weft yarns with a plurality of warp yarns to define multiple layers, including interconnecting the multiple layers through a connection zone defined intermediate two opposed ends of the preform fabric by weaving some of the weft yarns to form loops each extending from one of the ends of the preform fabric, through one of the layers, through the connection zone, through a different one of the layers and back to the one of the ends without reaching the other of the ends.

In a further aspect, there is provided a weaved preform fabric produced by the above method.

BRIEF DESCRIPTION OF THE DRAWINGS

Reference will now be made to the accompanying drawings, showing by way of illustration particular embodiments of the present invention and in which:

FIG. 3 is a schematic front view of some of the weft and warp yarns of the preform fabric weaved by the machine of FIG. 2;

DETAILED DESCRIPTION OF PARTICULAR EMBODIMENTS

Figure 1:
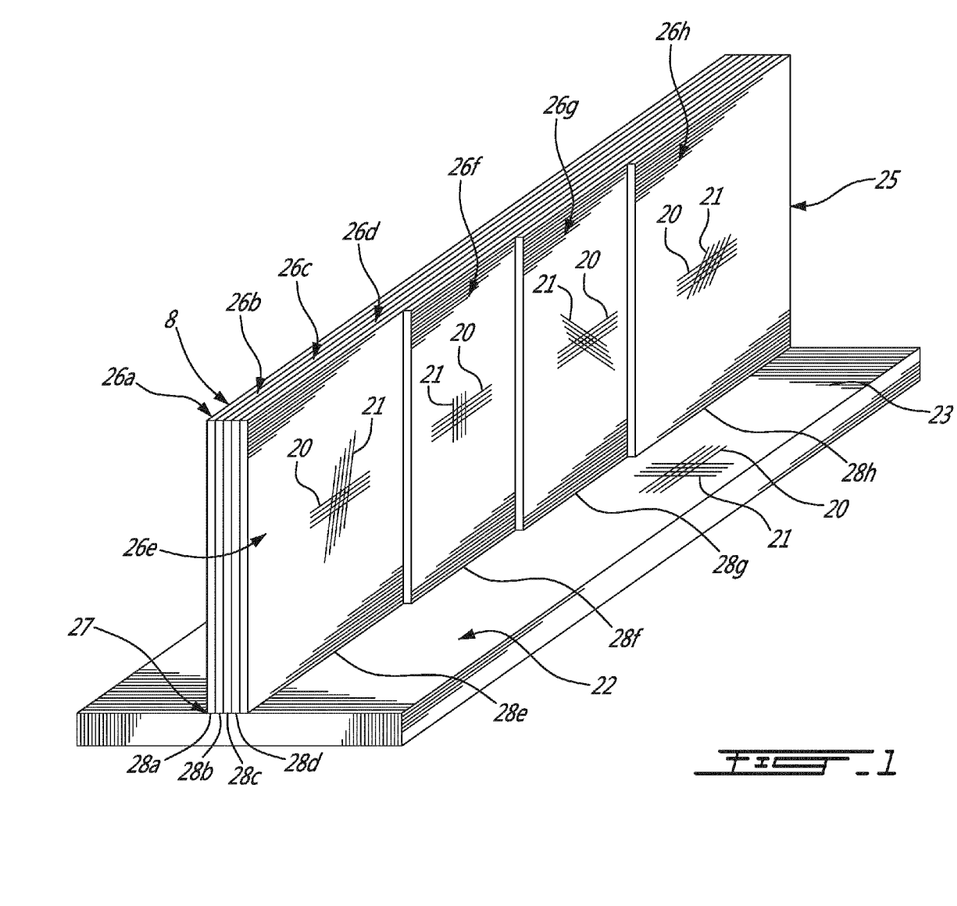
FIG. 1 is a schematic tridimensional view of a fiber preform in accordance with a particular embodiment.

Referring to FIG. 1, a layered preform 8 according to a particular embodiment is shown. The preform 8 has an inverted T-shaped cross-section with a thick layer 23 forming a base portion 22 of the inverted "T". The preform 8 also has eight (8) superposed and interconnected thin layers 26a-h together forming the vertical portion 25 of the inverted "T", each having an edge 28a-h attached to the base portion 22 through a connection zone 27 by the weft yarns. The attached edges 28a-h are parallel and adjacent one another. The thin layers 26a-h are also interconnected away from the attached edges 28a-h, for example by stitching.

The layers 23, 26a-h each have a weaved structure including warp yarns 20 extending at least substantially parallel to the attached edges 28a-h, but have differently oriented weft yarns 21. The thick layer 23 has weft yarns 21 oriented at 90°, with the warp yarn orientation defining the 0° direction. In the embodiment shown, the two thin central layers 26d, 26e have weft yarns 21 oriented at 15° and extend between two thin layers 26c, 26f having weft yarns 21 oriented at 90°, extending between two thin layers 26b, 26g having weft yarns 21 oriented at −45°, extending between two thin outer layers 26a, 26h having weft yarns 21 extending at 45°. Although one particular embodiment is shown, it is understood that the preform 8 may have any alternate adequate cross-sectional shape, including but not limited to I-shape, L-shape, U-shape, non-symmetrical cross-section, etc., with a different number of layers and/or different weft yarn orientations. For example, all of the layers 26a-h may have an orientation different from 90°.

In a particular embodiment, the yarns 20, 21 are carbon fibers, but other adequate materials are also possible. The preform 8 is obtained by first weaving a preform fabric 9 having perpendicular or substantially perpendicular warp and weft yarns 20, 21, deforming at least some of the thin layers to obtain the desired weft yarn orientation, and then attaching the deformed layers together to maintain the deformation, as will be further detailed below.

In a particular embodiment, the preform 8 is part of a structural element which is formed by inserting the preform 8 in a mold, impregnating it in an adequate type of resin and curing the resin.

Figure 2:
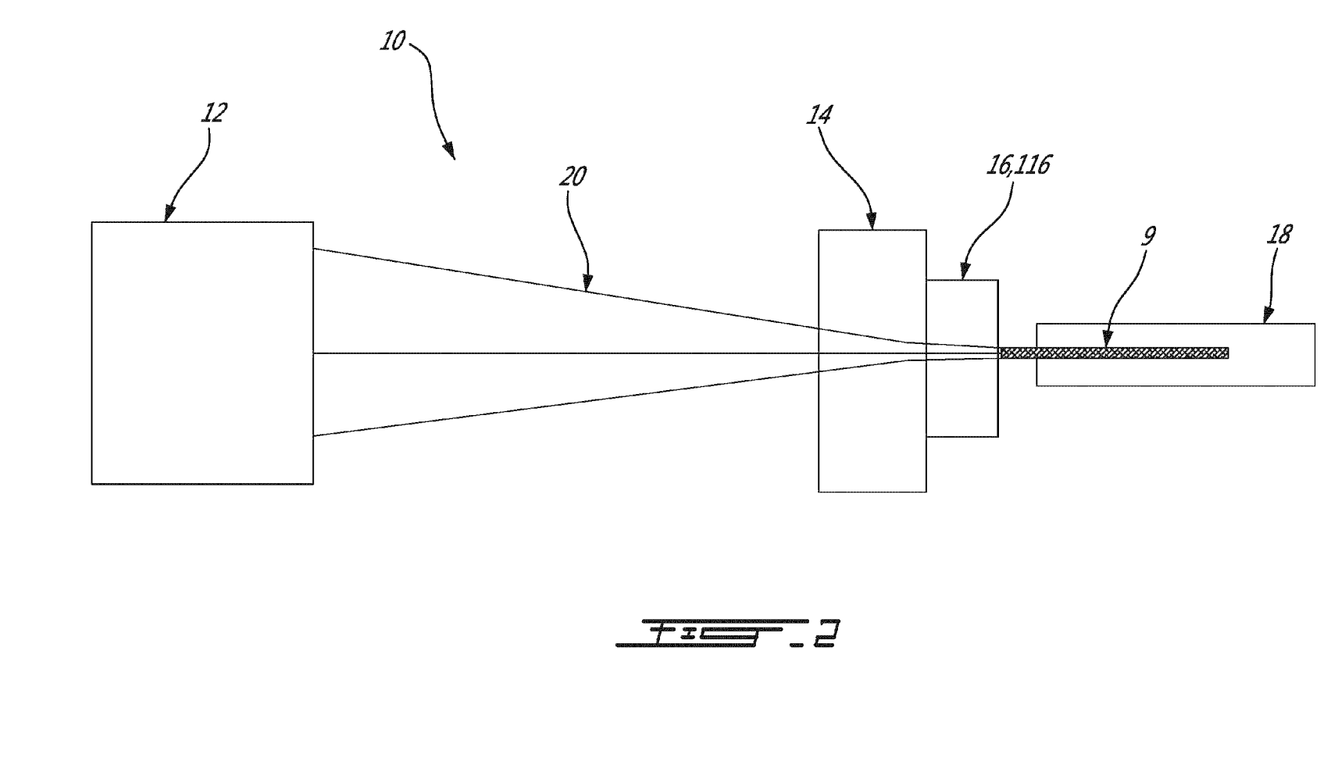
FIG. 2 is a schematic side view of a weaving machine for producing a preform fabric which may be used to obtain the preform of FIG. 1.

Referring now to FIG. 2, a weaving machine 10 for weaving the preform fabric 9 is generally shown. The machine 10 includes a creel 12 supporting bobbins of warp yarns 20, a shed opening unit 14 through which the warp yarns 20 extend and which moves the warp yarns 20 to open different sheds for weaving, a weft insertion mechanism 16, 116 adjacent and downstream of the shed opening unit 14 for inserting weft yarns through the open sheds, and an extracting unit 18 downstream of the weft insertion mechanism 16, 116. In a particular embodiment, the shed opening unit 14 allows for independent movement of every warp yarn 20 such as to have flexibility for opening the sheds. Although not shown, in a particular embodiment the extracting unit 18 includes a conveyor supporting and moving the preform fabric 9 away from the creel 12 as it is woven to maintain the warp yarns 20 under adequate tension, as well as a sewing and cutting mechanism downstream of the conveyor.

Referring to FIG. 3, the weft insertion mechanism 16, 116 inserts the weft yarns 21 alternately over and under adjacent rows of the warp yarns 20 while traveling in a direction perpendicular or substantially perpendicular to the warp yarns 20. The weft yarns 21 may travel from one side to the other across the complete width of the woven fabric 9, as illustrated in A. The weft yarns 21 may also enter the bundle of warp yarns 20 from one side, travel through only part of the width of the fabric 9, change direction to reach lower or higher layers of warp yarns 20, then turn around and exit back the same side such as to create a loop 30 with the weft yarn 21 which does not extend through the complete width of the woven fabric 9, as illustrated in B. In a particular embodiment, the preform fabric 9 includes both weft yarns inserted as in A and weft yarns inserted as in B to form loops 30. The presence of loops 30 may help facilitate folding of the preform, help obtaining certain mechanical properties (e.g. given stiffness or continuity) in the preform, help obtaining other properties in the finished product (e.g. given path of an electrode defined by one or more weft yarns), and/or allow for the formation of distinct layers. It is also understood that the preform fabric 9 may be foldable and/or may include separate layers without the presence of loops 30.

Figures 4A, 4B, 4C, 4D, 4E, 4F:
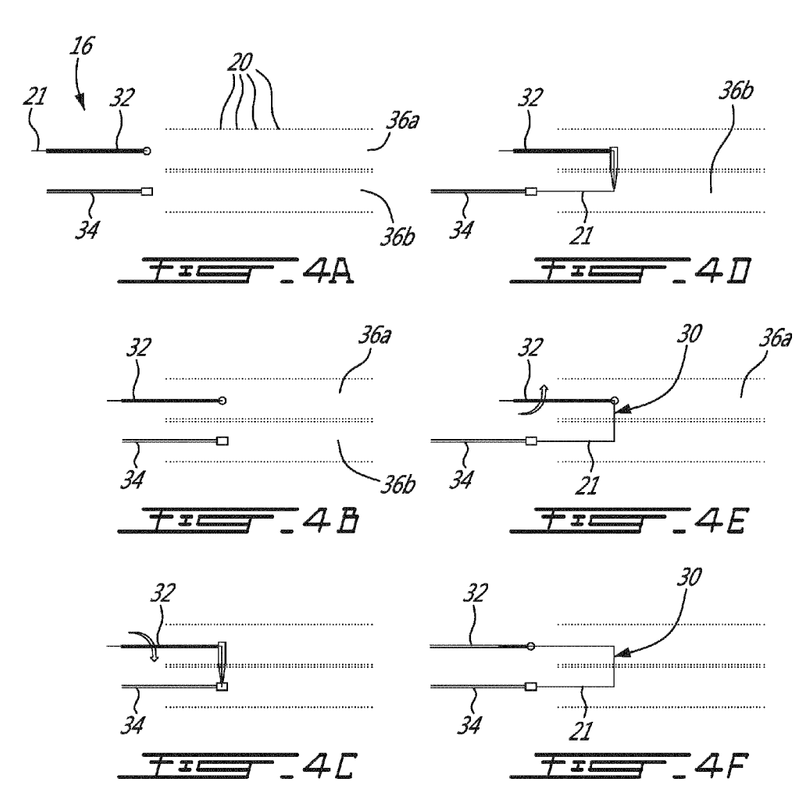
FIGS. 4A-4G are schematic front views of part of a weft insertion mechanism of the machine of FIG. 2, illustrating successive steps in the insertion of a weft yarn.
Figure 4G:
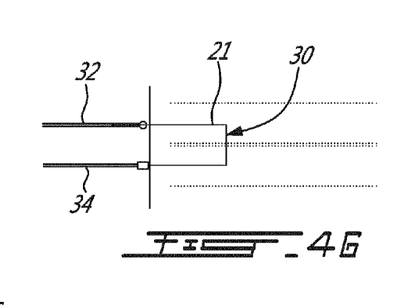

FIGS. 4A-G illustrates one example of a weft insertion mechanism 16 for forming the above-mentioned loop 30, including an upper horizontal rapier 32 and a lower horizontal rapier 34 both extending from a same side of the preform fabric 9. In a particular embodiment, in order to create a loop 30, the shed opening unit 14 moves the warp yarns 20 to separate them in three rows and as such open an upper shed 36a and a lower shed 36b. In FIG. 4A, both rapiers extend from a same side of the preform fabric 9, with the upper rapier 32 being aligned with the upper shed 36a and the lower rapier 34 being aligned with the lower shed 36b. The upper rapier 32 retains the weft yarn 21. The two rapiers 32, 34 then penetrate their respective shed 36a, 36b, as shown in FIG. 4B, up to only part of the width of the preform fabric 9. The upper rapier 32 then rotates downwardly and contacts the lower rapier 34, which catches the weft yarn 21 (FIG. 4C), and the lower rapier 34 retracts from its shed 36b while pulling the weft yarn 21, the upper rapier 32 remaining in place while still holding/guiding the weft yarn 21 (FIG. 4D). The upper rapier 32 then rotates back to its in-line position (FIG. 4E), before retracting from the upper shed 36a, leaving the weft yarn 21 forming the loop 30 (FIG. 4F). As shown in FIG. 4G, the weft yarn 21 can then be cut and/or released from the two rapiers 32, 34 and the two sheds 36a,b can be closed. For example, the weft yarn 21 is cut before forming a loop in a different one of the thin layers 24a-h.

Alternately, the weft yarn 21 can be transferred between the rapiers 32, 34 by an additional rapier penetrating the fabric 9 transversely to the sheds 36a,b and grabbing the weft yarn 21 from the upper rapier 32 to bring it to the lower rapier 34.

Figure 5:
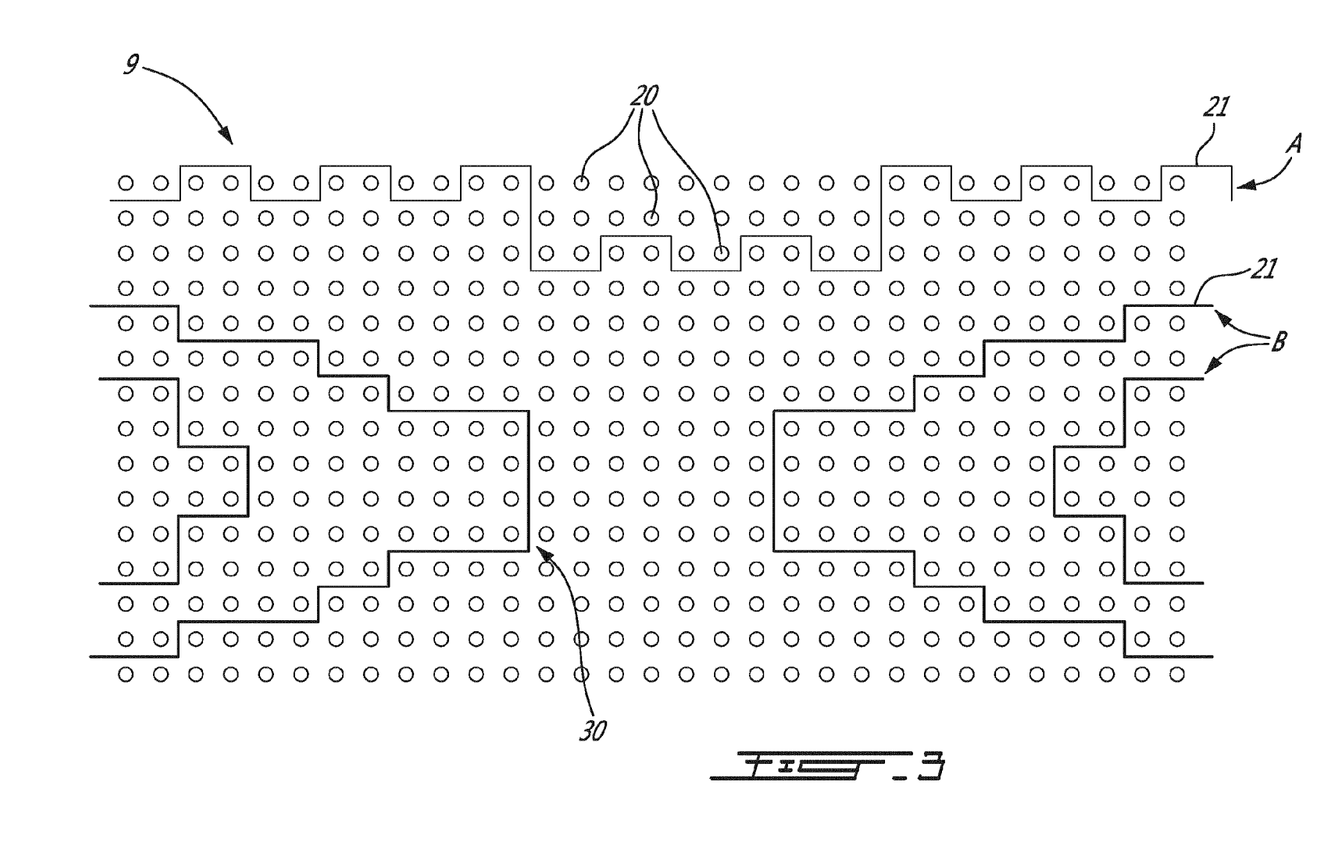
FIGS. 5A-5G are schematic front views of part of an alternate weft insertion mechanism of the machine of FIG. 2, illustrating successive steps in insertion of a weft yarn.
Figure 5A:
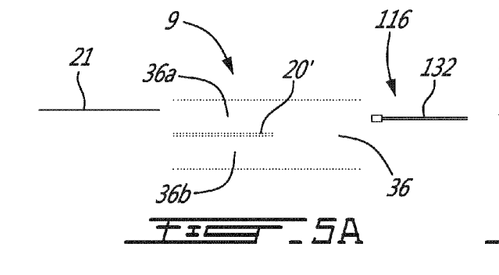
Figure 5B:
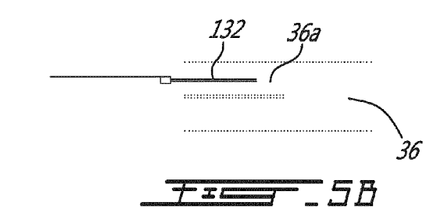
Figure 5C:
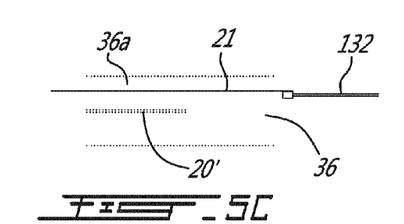
Figure 5D:
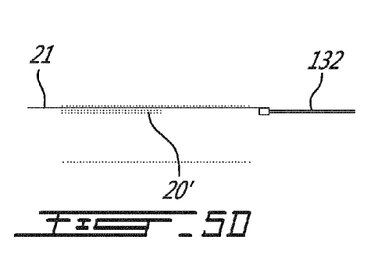
Figure 5E:
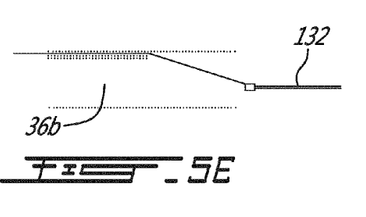
Figure 5F:
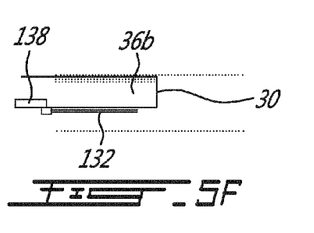
Figure 5G:
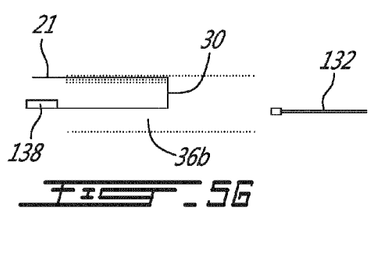

FIGS. 5A-G illustrate another example of a weft insertion mechanism 116 for forming the loop 30, this time using a single horizontal rapier 132. In a particular embodiment, in order to create a loop 30, the shed opening unit 14 moves the warp yarns 20 to separate them in upper and lower rows along the width of the fabric 9 and into a central row 20' which extends along only part of the width of the fabric 9 between the upper and lower rows, as shown in FIG. 5A. As such, upper and lower sheds 36a,b are open along only part of the width of the fabric 9, and a single shed 36 is open along the remaining part. The rapier 132 penetrates the fabric 9 from the single shed 36 and extends through the upper shed 36a to grab the weft yarn 21, as shown in FIG. 5B. The rapier 132 pulls the weft yarn 21 through the upper shed 36a and single shed 36, along a length of at least double that of the central row of warp yarns 20', as shown in FIG. 5C. The upper shed 36a is closed, as shown in FIG. 5D. The rapier 132 moves down in alignment with the lower shed 36b which is still open, as shown in FIG. 5E. The rapier 132 brings the weft yarn 21 back through the lower shed 36b, as shown in FIG. 5F, where the weft yarn 21 is caught by a gripper 138, for example a mechanical gripper or a vacuum, to form the loop 30. The rapier 132 then releases the weft yarn 21 and pulls back out of the fabric 9, as shown in FIG. 5G, after which the lower shed 36b can be closed. The weft yarn 21 is cut before forming a loop in a different one of the thin layers 24a-h. The rapier 132 may include a pneumatic system to blow on the weft yarn 21 to prevent its entanglement, for example between/during the steps illustrated in FIGS. 5E and 5F.

It is understood that the weft insertion mechanisms 16, 116 shown and described as well as the associated insertion methods are set forth in an exemplary manner only, and that other types/configurations for the weft insertion mechanism and/or other insertion methods are also possible. For example, in one embodiment the rapiers are replaced by an open tube delivering pressurized air and another open tube creating a vacuum, with the tubes having for example a demi-venturi cross-sectional shape, to push and pull the weft yarn in place using air pressure without mechanically grapping the yarn. Other types and configurations are also possible.

The preform fabric 9 may be weaved using any adequate type of weaving pattern, including, but not limited to, plain weave, twill, satin and non crimp structure, combinations thereof. Different layers may be weaved using different types of pattern.

Figure 6A:
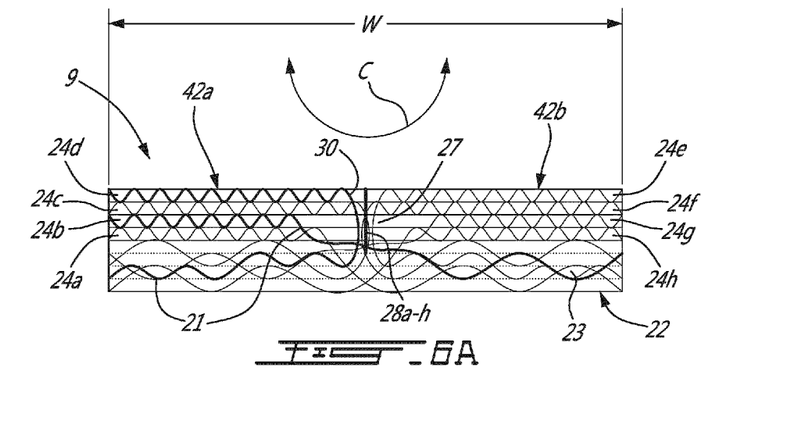
FIG. 6A is a schematic front view of a preform fabric which may be weaved by the machine of FIG. 2 and from which the fiber preform of FIG. 1 may be obtained.

FIG. 6A shows one example of a preform fabric 9 which may be weaved by the machine 10 and used to obtain the preform 8 shown in FIG. 1. The fabric 9 includes the thick layer 23 defining the base portion 22. The connection zone 27 is defined intermediate the opposed ends of the thick layer 23 and extends from its surface. The thin layers are defined as first and second side-by-side stacks 42a,b of four (4) superposed thin layers 24a-d and 24e-h each, resting on the surface of the thick layer 23. The thin layers 24a-h have edges 28a-h interconnected and connected to the thick layer 23 through the connection zone 27, and are otherwise free from one another and from the thick layer 23. The layers 23, 24a-h are weaved extending parallel to one another, as illustrated in FIG. 6A, with the warp yarns 20 extending in the direction of the connected edges 28 (i.e. perpendicularly to the plane of FIG. 6A), and the weft yarns 21 extending at least substantially perpendicular to the warp yarns.

In the embodiment shown, the preform fabric 9 is woven with weft yarns 21 extending throughout the complete width W of the fabric 9. Each of the thin layers 24a-d of the first stack 42a includes weft yarns 21 continuing into the portion of the thick layer 23 under the second stack 42b, and each of the thin layers 24e-h of the second stack 42b includes weft yarns 21 continuing into the portion of the thick layer 23 under the first stack 42a. The weft yarns extending from the two stacks 42a,b cross each other in the connection zone 27.

In the embodiment shown, the preform fabric 9 is also woven with weft yarns 21 forming loops 30 extending only through part of the complete width W of the fabric 9. For each of the thin layers 24a-d of the first stack 42a, the weft yarns 21 include yarns extending through that layer, through the connection zone 27, and back into the portion of the thick layer 23 under that first stack 42a, without reaching the opposed end of the fabric 9, to form a loop 30. Similarly, for each of the thin layers 24e-h of the second stack 42b, the weft yarns includes yarns extending through that layer, through the connection zone 27, and back into the portion of the thick layer 23 under that second stack 42b without reaching the opposed end of the fabric 9.

In addition, some weft yarns can extend throughout the width W of the fabric 9 by extending through one of the thin layers 24a-d of the first stack 42a, through the connection zone 27 and through one of the thin layers 24e-h of the second stack 42b, and/or can form loops 30 extending only throughout part of the width W of the fabric 9 by extending through one of thin layers 24a-h, through the connection zone 27 and back through another of the thin layers of the same stack 42a,b.

The only portion of the preform fabric 9 where the weft yarns extend 21 across different layers 24a-h, 23 is the connection zone 27, such that the layers 24a-h, 25 are independent from one another away from this zone.

Figure 6B:
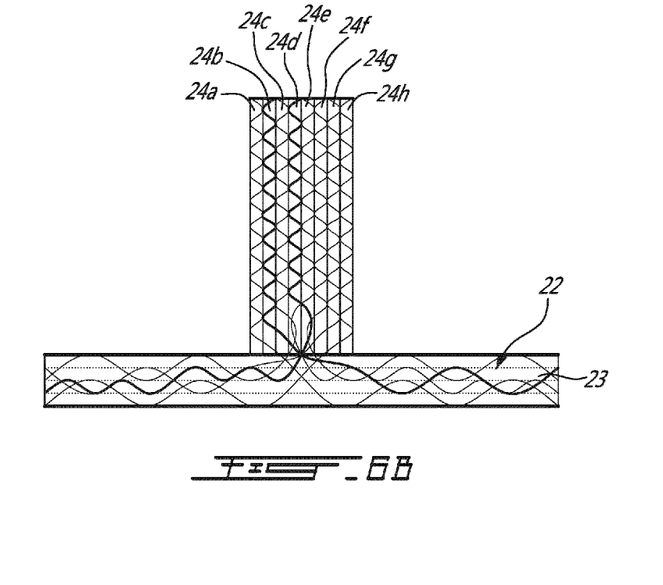
FIG. 6B is a schematic front view of the preform fabric in FIG. 6A with thin layers folded in position for obtaining a fiber preform such as shown in FIG. 1.

In the embodiment shown, once woven, the thin layers 24a-h are folded by pivoting them around their edge 28a-h connected to the connection zone 27, one stack 42a,b toward the other, as depicted by arrow C, such that the two stacks 42a,b of thin layers 24a-h abut each other and extend at least substantially perpendicularly to the thick layer 23 to define the inverted T-shaped cross section shown in FIG. 6B.

Figure 7A:
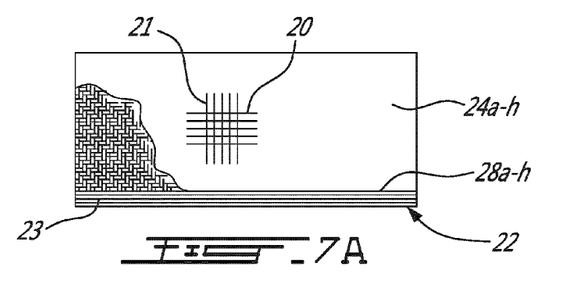
FIGS. 7A-7D are schematic side views of the preform fabric of FIGS. 6A-6B, illustrating the thin layers thereof being deformed and attached to create a fiber preform such as shown in FIG. 1.
Figure 7B:
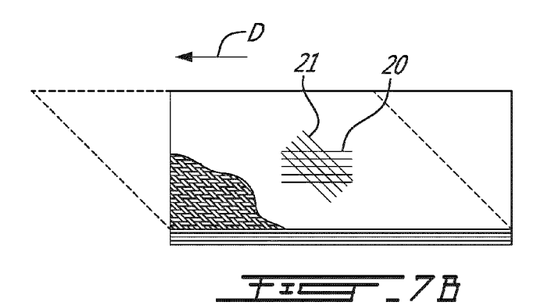
Figure 7C:
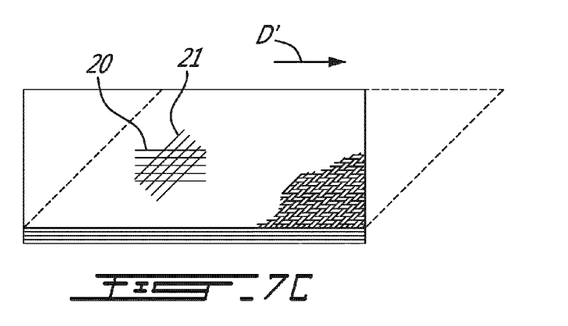

Once the preform fabric 9 is folded to the desired shape, illustrated by FIG. 6B and FIG. 7A, one or more of the thin layers 24a-h is/are deformed along a direction D, D' at least substantially parallel to the warp yarns 20 to define the corresponding preform layer 26a-h. The orientation of the weft yarn 21 of the thin layer(s) 24a-h being deformed thus changes from 90° (FIG. 7A) to a desired orientation of −θ (FIG. 7B) or +θ (FIG. 7C) with respect to the warp yarns 20 which extend at 0°, with θ being defined between 0° and 90°. Since the deformation is performed in a parallel or substantially parallel manner to the orientation of the warp yarns 20, the orientation of the warp yarns 20 is not, or substantially not, affected.

Figure 7D:
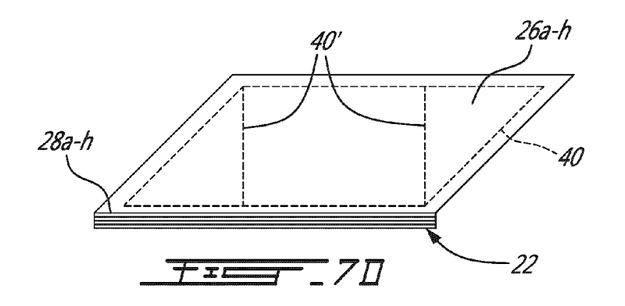

In a particular embodiment, all of the thin layers 24a-h are deformed with at least some of the deformed layers having weft yarns 21 with different orientations±θ from one another; alternately, all of the thin layers 24a-h may be deformed to the same orientation±θ, all of the thin layers 24a-h may be deformed with some having different orientations±θ and some having the same orientation±θ, or some of the thin layers 24a-h may remain undeformed, i.e. with perpendicular warp and weft yarns 20, 21. For example, to obtain the fiber preform 8 of FIG. 1, two of the layers 24a-h remain undeformed while the other layers are deformed by pairs at 15°, 45° and −45° to define the preform layers 26a-h shown and detailed above. Once the desired deformation is reached, the preform layers 26a-h are attached to one another away from their edge 28a-h connected to the thick layer 23, for example through stitching 40, as shown in FIG. 7D. If the ends of the preform need to be trimmed before the preform is impregnated in resin and cured, for example to obtain perpendicular edges, it is understood that the stitching is performed such as to be within the region of the preform that remains after the trimming process, as shown for example by stitching 40'.

In a particular embodiment, the thin layers 24a-h are weaved with a lower fiber density than that of the thick layer 23. In a particular embodiment, the density of the thin layers 24a-h is selected such that after an increase in weave density caused by the deformation to reach the desired orientation±θ, the preform layers 23, 26a-h have similar weaved densities. In another particular embodiment, the preform layers 23, 26a-h have different densities after deformation. The weave density may be different between thin layers 24a-h to be deformed following different orientations±θ. The density of the thin layers 24a-h is sufficiently low to be able to apply the deformation and obtain the desired orientation±θ for each of the preform layers 26a-h.

Figure 8A:
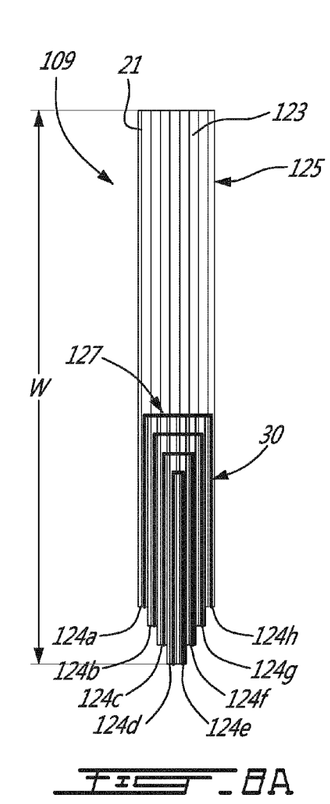
FIGS. 8A-8C are schematic front views of an alternate preform fabric, illustrating the thin layers thereof being folded and attached to obtain a fiber preform in accordance with an alternate embodiment.
Figure 8B:
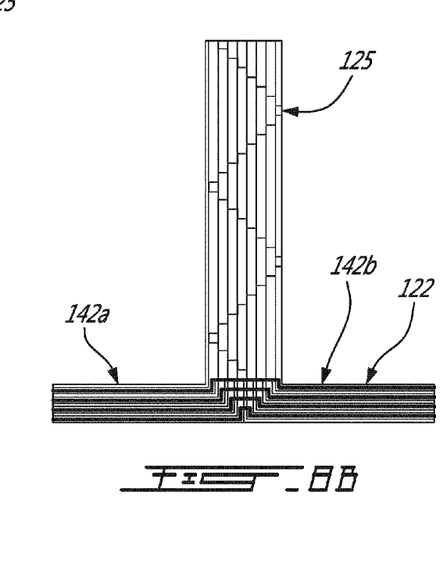
Figure 8C:
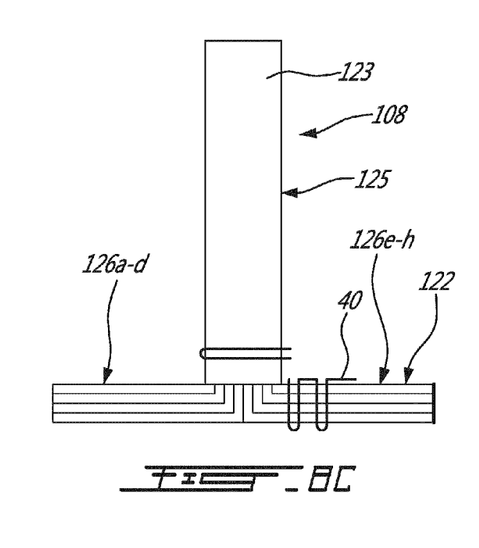

FIGS. 8A-C show a different preform fabric 109 and resulting preform 108 also having an inverted T-shaped cross-section, including a thick layer 123 forming the vertical portion 125 of the inverted "T" and a plurality of thin layers 124a-h woven in a superposed manner as extending from one end of the thick layer 123 with a connection zone 127 defining the connection between the thin layers 124a-h and the thick layer 123, as illustrated by FIG. 8A. As above, the layers 124a-h, 123 are woven with perpendicular or substantially perpendicular warp and weft yarns 20, 21. In the embodiment shown, the weft yarns 21 include yarns that extend throughout the width W of the fabric 9, i.e. each of the thin layers 124a-h includes weft yarns extending across that layer and continuing across the thick layer 123. The weft yarns 21 also include yarns that form a loop 30 extending across only part of the width W of the fabric 9, i.e. each of the thin layers 124a-h includes weft yarns extending across that layer, through the connection zone and back through another one of the thin layers 124a-h.

The thin layers 124a-h are then folded away from one another in two side-by side identical stacks 142a, 142b to form the base portion 122 of the inverted "T", as shown in FIG. 8B, after which the thin layers 124a-h are deformed to obtain the desired weft yarn orientation(s)±θ and attached to maintain that orientation±θ to define the preform layers 126a-h. Additional yarns may be added to the thick layer 123 before or after deforming the thin layers 124a-h. FIG. 8C shows the preform 108 once the thin layers are deformed and attached together to define the preform layers 126a-h, for example through stitching 40.

In another embodiment which is not shown, the preform and preform fabric have the same cross-section, i.e. the thin layers of the preform fabric are not folded to obtain the desired preform.

The above described method thus allows the manufacture of a fiber preform with oriented weft yarns, i.e. weft yarns non perpendicular to the warp yarns, from a preform fabric obtained by a weaving process producing perpendicular weft and warp yarns. Fiber preforms with oriented weft yarns may advantageously be produced using existing machinery weaving perpendicular fibers. The oriented weft yarns may advantageously provide for improved mechanical properties of the preform in transverse directions.

The connection zone 27, 127 may help solidify the connection between the layers, and as such reduce the risk of delamination of the composite manufactured from the preform.

The loops 30 may also be used in a preform fabric in which the layers are not deformed after weaving, i.e. in which the weft yarn orientation obtained through the weaving process is maintained in the preform, for example to help retain the different layers together, facilitate folding of the preform, help obtaining certain mechanical properties, and/or allow for the formation of distinct layers.

In a particular embodiment, the preform is manufactured as a beam with a constant cross-section. In another particular embodiment, the preform is manufactured as a beam with a constant cross-sectional shape but with varying cross-sectional dimensions.

The portion of the fiber preform which does not need to be oriented can be weaved as a single thick layer 23, 123. Alternately, the connection zone may be defined as common edges between the thin layers such that the preform does not include a significant portion defined as a thick layer. For example, the preform may have a cross shape with the connection zone being defined at the center of the cross, and each leg of the cross being defined by multiple thin layers interconnected at that center.

Additional yarns may be added once the preform has been weaved, for example to increase the weave density of certain zones and/or to solidify the connection between the thin layers.

The embodiments of the invention described above are intended to be exemplary. Those skilled in the art will therefore appreciate that the foregoing description is illustrative only, and that various alternate configurations and modifications can be devised without departing from the scope of the present invention. Accordingly, the present invention is intended to embrace all such alternate configurations, modifications and variances which fall within the scope of the appended claims.

The invention claimed is:

1. A method of producing a fiber preform for a composite structural element, the method comprising:

forming a weaved preform fabric including a connection zone and multiple layers extending from the connection zone, each layer having an edge attached to the connection zone with a remainder of each of the layers extending freely from each other and from the connection zone, the attached edges being parallel and adjacent one another, each of the layers having a weaved structure including warp yarns extending at least substantially parallel to the attached edges and weft yarns extending at least substantially perpendicularly to the warp yarns;

deforming at least one of the layers along a direction at least substantially parallel to the warp yarns to change an orientation of the weft yarns thereof with respect to the warp yarns until the weft yarns thereof have a corresponding desired orientation with respect to the warp yarns, the desired orientation being between 0° and ±90°; and attaching the layers together away from the attached edges to retain the weft yarns of the at least one deformed layer at the desired orientation with respect to the warp yarns.

2. The method as defined in claim 1, further including, before deforming the at least one of the layers, folding at least some of the layers about the connection zone.

3. The method as defined in claim 2, wherein the layers are folded such that the preform fabric defines a T shape.

4. The method as defined in claim 2, wherein the preform fabric is formed such that at least some of the layers are disposed side by side, and folding the layers includes pivoting the layers disposed side by side toward each other to a superposed position.

5. The method as defined in claim 2, wherein the preform fabric is formed such that at least some of the layers are superposed, and folding the layers includes pivoting the superposed layers away from each other to a side by side position.

6. The method as defined in claim 1, wherein deforming the at least one of the layers includes deforming at least two of the layers in opposite directions to have opposite desired orientations.

7. The method as defined in claim 1, wherein attaching the layers is performed by stitching.

8. The method as defined in claim 1, wherein the connection zone is defined spaced apart from two opposed ends of the preform fabric, and forming the preform fabric includes weaving a plurality of the weft yarns to form loops each extending from one of the opposed ends up through the connection zone and back to the one of the opposed ends without reaching the other of the opposed ends.

9. The method as defined in claim 1, wherein the layers are first layers, and wherein forming the preform fabric includes forming a second layer having a thickness greater than a thickness of each of the first layers by weaving at least some of the weft yarns from each one of the first layers into the second layer, the second layer being connected to the connection zone.

10. The method as defined in claim 9, wherein the connection zone is defined spaced apart from two opposed ends of the preform fabric, and wherein forming the preform fabric includes weaving a plurality of the weft yarns to form loops each extending from one of the opposed ends through one of the first layers, through the connection zone, through a different one of the first layers and back to the one of the opposed ends without reaching the other of the opposed ends.

11. The method as defined in claim 9, wherein the connection zone is defined spaced apart from two opposed ends of the preform fabric, and wherein forming the preform fabric includes weaving a plurality of the weft yarns to form loops each extending from one of the opposed ends through one of the first layers, through the connection zone, through the second layer and back to the one of the opposed ends without reaching the other of the opposed ends.

12. The method as defined in claim 9, wherein forming the preform fabric includes weaving the second layer such that the connection zone is defined at one end thereof and weaving the first layers to extend from the connection zone away from the second layer.

13. The method as defined in claim 9, wherein forming the preform fabric includes weaving the second layer such that the connection zone is defined intermediate two opposed ends thereof and along a surface thereof, and weaving the first layers to rest on the surface of the second layer in two side-by-side stacks with the connected edges extending therebetween.

14. A fiber preform produced by the method defined in claim 1.

15. The fiber preform as defined in claim 14, wherein the warp yarns and the weft yarns are made of carbon fiber.

16. A method of forming a weaved preform fabric for a fiber preform of a composite structural element, the method comprising weaving a plurality of weft yarns with a plurality of warp yarns to define multiple layers, including interconnecting the multiple layers through a connection zone defined intermediate two opposed ends of the preform fabric by weaving some of the weft yarns to form loops each extending from one of the opposed ends of the preform fabric, through one of the layers, through the connection zone, through a different one of the layers and back to the one of the opposed ends without reaching the other of the opposed ends of the reform fabric and without interconnecting the one of the layers and the different one of the layers outside of the connection zone.

17. The method as defined in claim 16, wherein the multiple layers include a plurality of thin layers and a thick layer interconnected through the connection zone, and weaving the plurality of weft yarns includes weaving a plurality of the weft yarns extending through the thin layer, the connection zone and the thick layer.

18. The method as defined in claim 17, wherein weaving some of the weft yarns to form loops includes forming loops extending from the one of the ends, through one of the thin layers, through the connection zone, through the thick layer and back to the one of the ends.

19. The method as defined in claim 17, wherein weaving some of the weft yarns to form loops includes forming loops extending from the one of the ends, through one of the thin layers, through the connection zone, through another one of the thin layers and back to the one of the ends.

20. A weaved preform fabric produced by the method defined in claim 16.

\* \* \* \* \*